(12) United States Patent
Natarajan et al.

(10) Patent No.: US 10,404,829 B2
(45) Date of Patent: Sep. 3, 2019

(54) METHOD AND SYSTEM FOR ACHIEVING IMPROVED QUALITY OF SERVICE (QOS) FOR CONTENT DELIVERY IN A SDN CONTROLLER BASED COMMUNICATION NETWORK

(71) Applicant: Wipro Limited, Bangalore (IN)

(72) Inventors: Gowrishankar Subramaniam Natarajan, Chennai (IN); Balaji Venugopal, Chennai (IN)

(73) Assignee: Wipro Limited, Bangalore (IN)

( * ) Notice: Subject to any disclaimer, the term of this patent is extended or adjusted under 35 U.S.C. 154(b) by 614 days.

(21) Appl. No.: 15/086,976

(22) Filed: Mar. 31, 2016

(65) Prior Publication Data
US 2017/0264711 A1    Sep. 14, 2017

(30) Foreign Application Priority Data
Mar. 11, 2016 (IN) .............................. 201641008532

(51) Int. Cl.
| | |
|---|---|
| H04L 29/06 | (2006.01) |
| H04L 29/08 | (2006.01) |
| H04L 12/26 | (2006.01) |
| H04L 12/721 | (2013.01) |
| H04L 12/24 | (2006.01) |

(52) U.S. Cl.
CPC ...... *H04L 67/327* (2013.01); *H04L 29/06047* (2013.01); *H04L 41/509* (2013.01); *H04L 41/5022* (2013.01); *H04L 43/08* (2013.01); *H04L 45/12* (2013.01); *H04L 65/4084* (2013.01); *H04L 65/80* (2013.01); *H04L 67/42* (2013.01)

(58) Field of Classification Search
USPC ........................................................ 709/203
See application file for complete search history.

(56) References Cited

U.S. PATENT DOCUMENTS

| | | | |
|---|---|---|---|
| 2008/0072159 A1* | 3/2008 | Cockerton | .......... H04L 12/1818 715/756 |
| 2014/0337417 A1* | 11/2014 | Park | .................... H04L 67/1027 709/203 |

(Continued)

*Primary Examiner* — Vivek Srivastava
*Assistant Examiner* — Hien V Doan
(74) *Attorney, Agent, or Firm* — Finnegan, Henderson, Farabow, Garrett & Dunner, LLP

(57) ABSTRACT

In one embodiment, an application server to achieve improved quality of service (QoS) for content delivery in a communication network is disclosed. The application server receives a request from a client device to deliver content to the client device. The application server determines a relative priority of each of a plurality of content delivery servers in the communication network based on at least one of one or more parameters and a configuration file. The application server identifies at least one content delivery server from the plurality of content delivery servers based on relative priority. The application server identifies a shortest path for the content delivery between the identified at least one content delivery server and the client device based on one or more pre-defined rules. The application server further transmits the content from the identified at least one content delivery server to the client device via the identified shortest path.

22 Claims, 4 Drawing Sheets

Method 300 for achieving improved quality of service (QoS) for content delivery in a communication network

(56) References Cited

U.S. PATENT DOCUMENTS

| | | | |
|---|---|---|---|
| 2015/0063112 A1* | 3/2015 | Wu | H04L 45/302 370/235 |
| 2015/0134814 A1* | 5/2015 | Ishizaka | H04L 43/08 709/224 |
| 2015/0150086 A1* | 5/2015 | Clark | G06F 19/322 726/3 |
| 2017/0163724 A1* | 6/2017 | Puri | H04L 43/0805 |

* cited by examiner

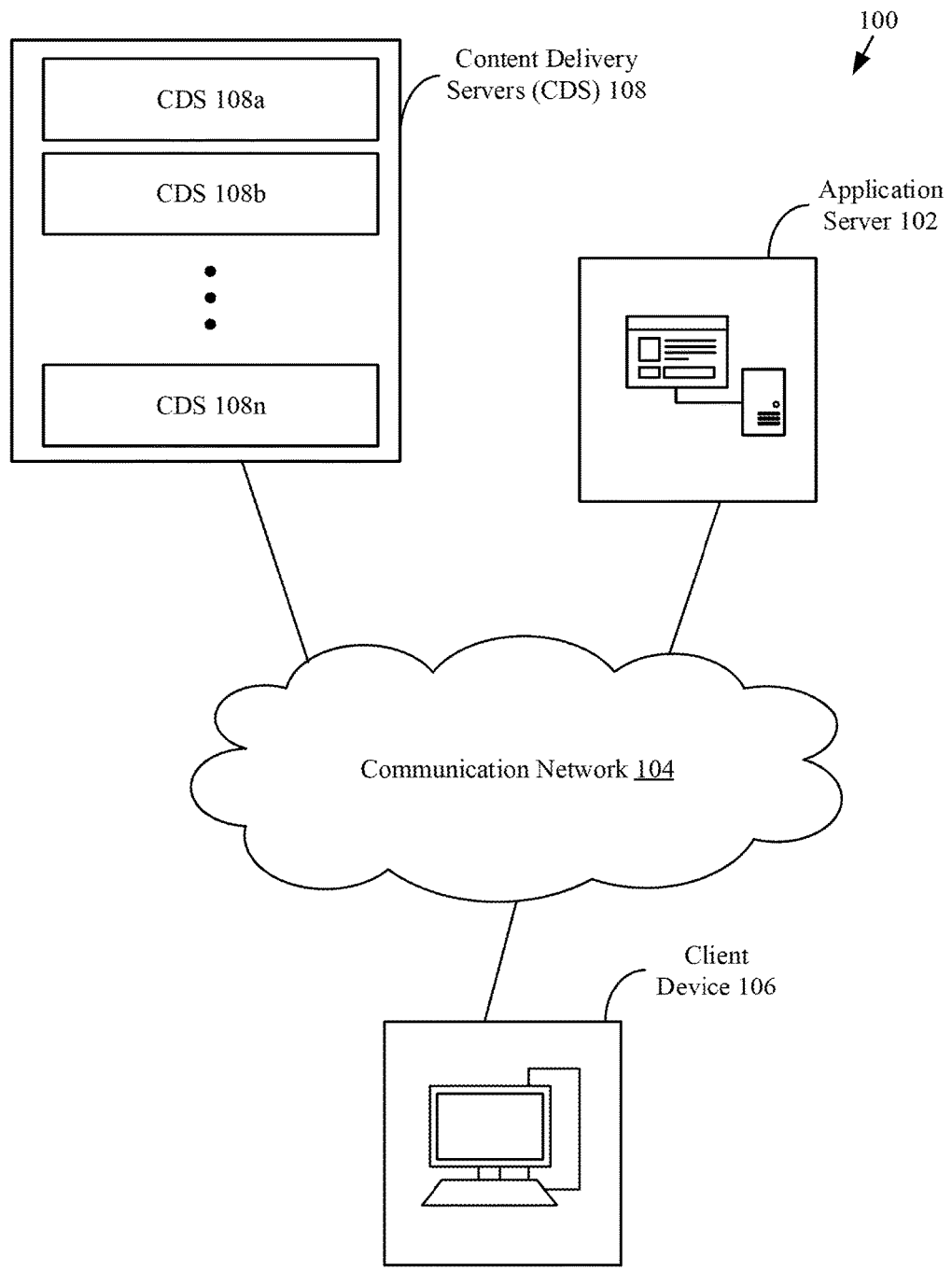
FIG. 1: System Environment 100

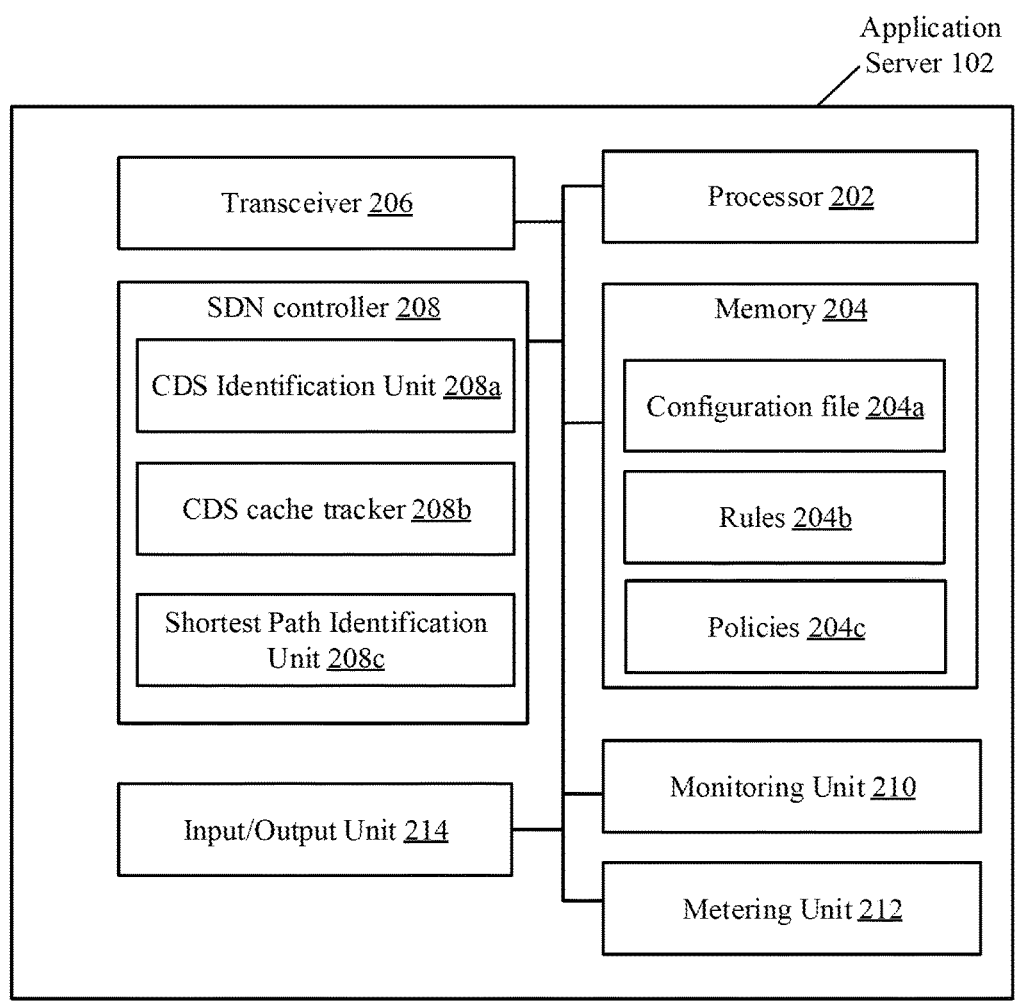
FIG. 2: Application server 102

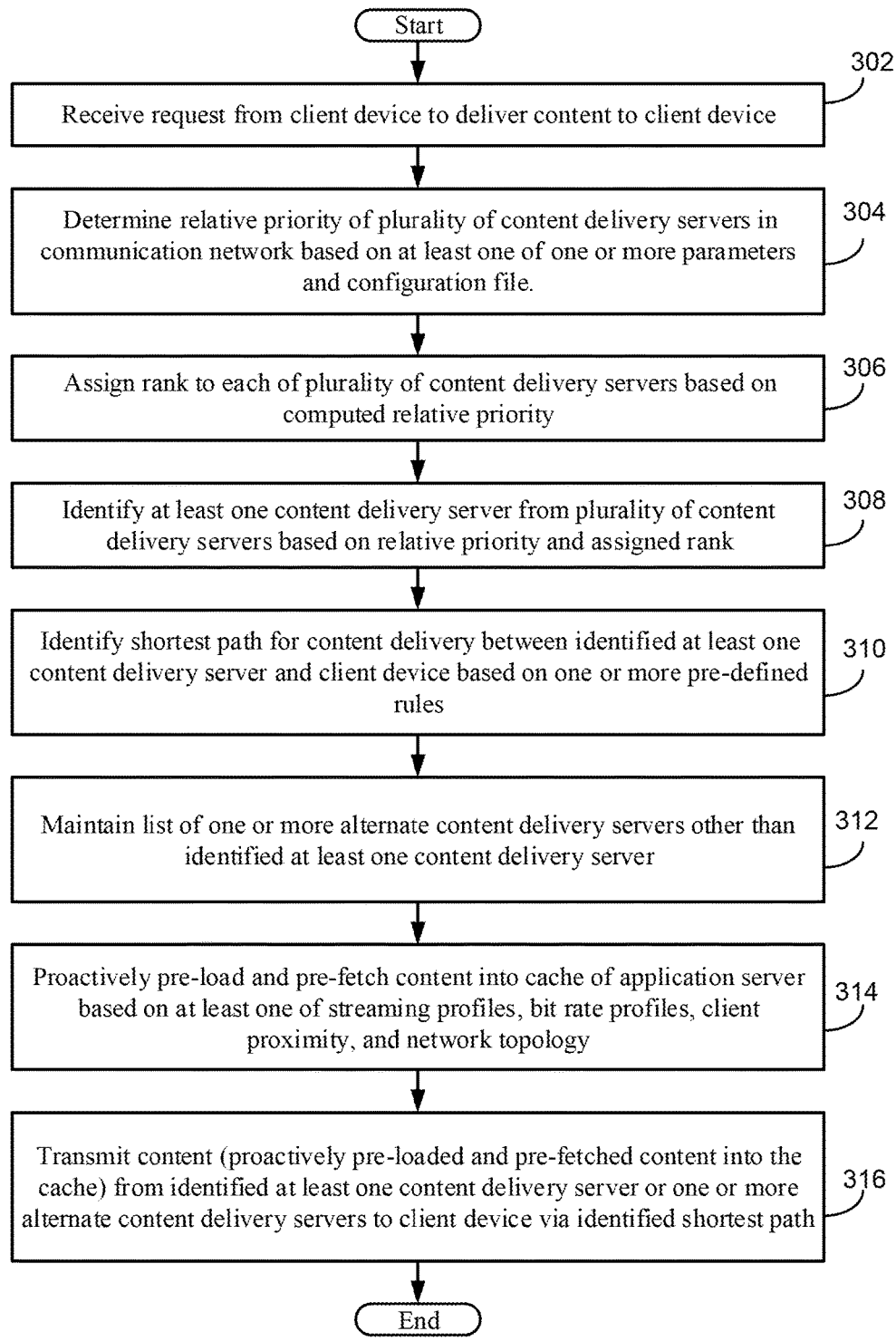
FIG. 3: Method 300 for achieving improved quality of service (QoS) for content delivery in a communication network

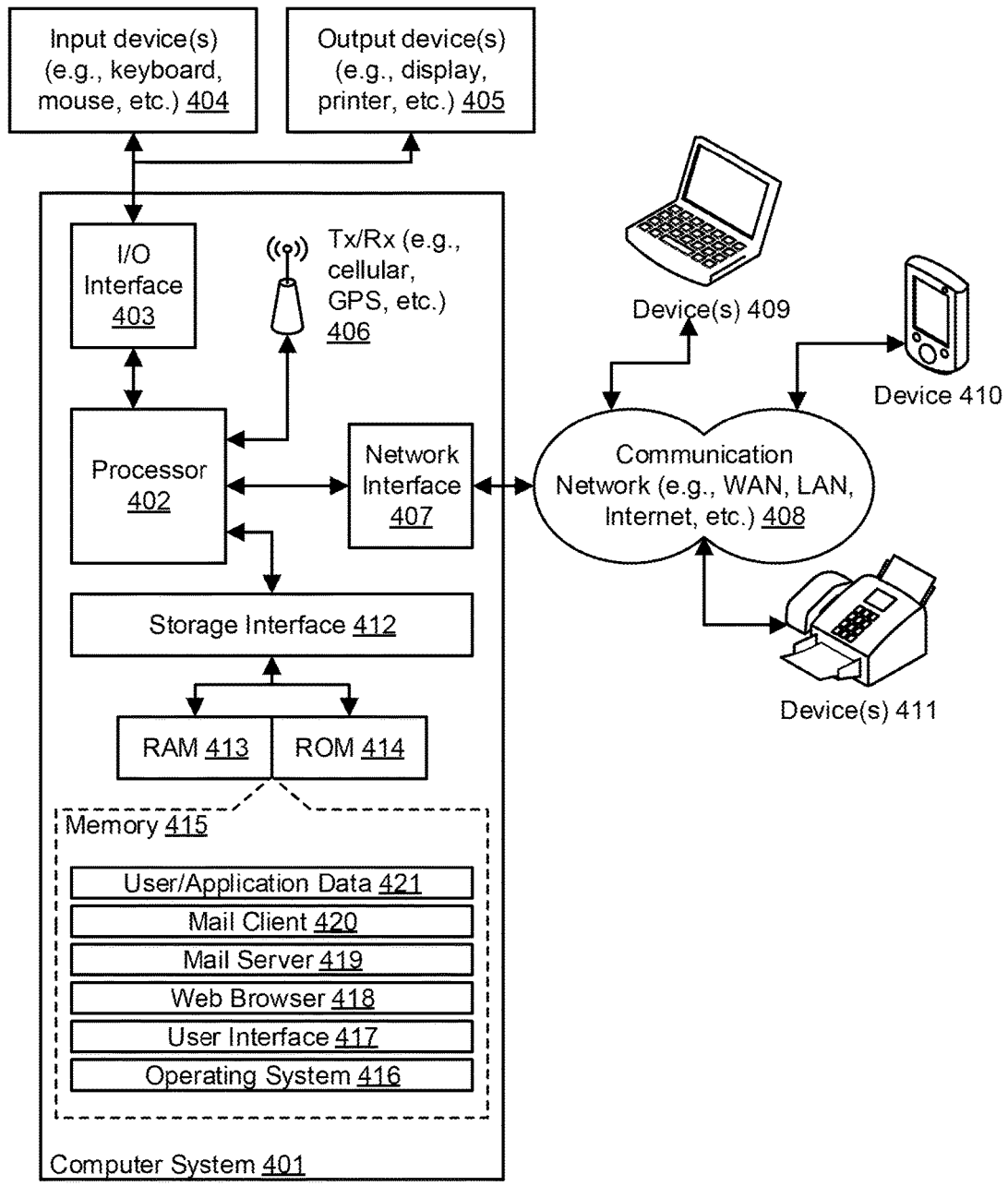
FIG. 4: Example Computer System

METHOD AND SYSTEM FOR ACHIEVING IMPROVED QUALITY OF SERVICE (QOS) FOR CONTENT DELIVERY IN A SDN CONTROLLER BASED COMMUNICATION NETWORK

TECHNICAL FIELD

This disclosure relates generally to content delivery in a Software Defined Network (SDN) Controller based communication network, and more particularly to a system and a method for achieving improved quality of service (QoS) for content delivery in a communication network.

BACKGROUND

Generally, Multi-programming Video Distributors (MPVDs) utilize content delivery network (CDNs) and one or more streaming technologies such as Adaptive Bit-rate (ABR) to accelerate delivery of content, such as video to one or more subscribers. Although CDNs guarantee content delivery from one or more servers closest to the one or more subscribers but when the network conditions are unstable then the content delivery may be patchy. Thus, if the network conditions are unstable then ABR merely adapts video player to adjust resolutions based on the end-to-end network conditions.

Additionally, if the network experiences congestion due to a malfunctioning delivery server or link related bottleneck on routing path, then changing the resolution does not translate to content delivery QoS improvements. Hence, when the content is delivered over congested IP & LTE networks, the user may be forced to rate limit or switch over to a lower bit rate/low quality stream through one of multiple rate switching algorithms that are implemented on the subscriber side.

Thus, currently it may be difficult to ensure better content delivery QoS for one or more subscribers beyond setting the available bandwidth and capping usage of the one or more subscribers.

SUMMARY

In one embodiment, a method for achieving improved quality of service (QoS) for content delivery in a Software Defined Network (SDN) Controller based communication network, is disclosed. The method comprises receiving, by an application server, a request from a client device to deliver content to the client device. The method further comprises determining, by the application server, a relative priority of each of a plurality of content delivery servers in the communication network based on at least one of one or more parameters and a configuration file. The method further comprises identifying, by the application server, at least one content delivery server from the plurality of content delivery servers based on relative priority, wherein the content delivery server hosts the content that may be delivered to the client device. The method further comprises identifying, by the application server, a shortest path for the content delivery between the identified at least one content delivery server and the client device based on one or more pre-defined rules, wherein one or more network resources in the shortest path may be sliced and metered based on one or more pre-defined policies. The method further comprises transmitting, by the application server, the content from the identified at least one content delivery server to the client device via the identified shortest path.

In one embodiment, an application server to achieve improved quality of service (QoS) for content delivery in a Software Defined Network (SDN) Controller based communication network, is disclosed. The application server comprises a processor and a memory communicatively coupled to the processor. The memory stores processor instructions, which, on execution, causes the processor to receive a request from a client device to deliver content to the client device. The processor further determines a relative priority of each of a plurality of content delivery servers in the communication network based on at least one of one or more parameters and a configuration file. The processor further identifies at least one content delivery server from the plurality of content delivery servers based on relative priority, wherein the content delivery server hosts the content that may be delivered to the client device. The processor further identifies a shortest path for the content delivery between the identified at least one content delivery server and the client device based on one or more pre-defined rules, wherein one or more network resources in the shortest path are sliced and metered based on one or more pre-defined policies. The processor further transmits the content from the identified at least one content delivery server to the client device via the identified shortest path.

According to embodiments illustrated herein, a non-transitory computer-readable storage medium having stored thereon, a set of computer-executable instructions for causing a computer comprising one or more processors to receive a request from a client device to deliver content to the client device. The one or more processors may be further configured to determine a relative priority of each of a plurality of content delivery servers in a communication network based on at least one of one or more parameters and a configuration file. The one or more processors may be further configured to identify at least one content delivery server from the plurality of content delivery servers based on relative priority, wherein the content delivery server hosts the content that is to be delivered to the client device. The one or more processors may be further configured to identify a shortest path for the content delivery between the identified at least one content delivery server and the client device based on one or more pre-defined rules, wherein one or more network resources in the shortest path are sliced and metered based on one or more pre-defined policies. The one or more processors may be further configured to transmit the content from the identified at least one content delivery server to the client device via the identified shortest path.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 is a block diagram that illustrates a system environment in which various embodiments of the method and the system may be implemented, in accordance with at least one embodiment.

FIG. 2 illustrates a block diagram of an application server configured to achieve improved quality of service (QoS) for content delivery in a communication network, according to some embodiments of the present disclosure.

FIG. 3 is a flow diagram that illustrates a method for achieving improved quality of service (QoS) for content delivery in a communication network, in accordance with some embodiments of the present disclosure.

FIG. 4 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses a system and a method for achieving improved quality of service (QoS) for content delivery in a communication network. The system and method may be implemented in a variety of computing systems. The computing systems that can implement the described method(s) include, but are not limited to a server, a desktop personal computer, a notebook or a portable computer, hand-held devices, and a mainframe computer. Although the description herein is with reference to certain computing systems, the system and method may be implemented in other computing systems, albeit with a few variations, as will be understood by a person skilled in the art.

Working of the application server and the method for achieving improved quality of service (QoS) for content delivery in a communication network is described in conjunction with FIGS. 1-4. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 is a block diagram that illustrates a system environment 100 in which various embodiments of the method and the system may be implemented, in accordance with at least one embodiment. The system environment 100 may include an application server 102, a communication network 104, a client device 106, and a plurality of content delivery servers (CDS) 108 such as 108a, 108b, . . . , 108n. The application server 102, the client device 106 and the plurality of content delivery servers 108 may be communicatively coupled with each other via the communication network 104.

In an embodiment, the application server 102 may refer to a computing device or a software framework hosting an application or a software service. In an embodiment, the application server 102 may be implemented to execute procedures such as, but not limited to, programs, routines, or scripts stored in one or more memories for supporting the hosted application or the software service. In an embodiment, the hosted application or the software service may be configured to perform one or more predetermined operations. The application server 102 may be realized through various types of application servers such as, but are not limited to, a Java application server, a .NET framework application server, a Base4 application server, a PHP framework application server, or any other application server framework.

In an embodiment, the application server 102 may be configured to receive a request from the client device 106 to deliver content to the client device 106. Further, the application server 102 may be configured to determine a relative priority of each of the plurality of content delivery servers 108 in the communication network 104 based on at least one of one or more parameters and a configuration file. Further, the application server 102 may be configured to identify at least one content delivery server, such as 108a from the plurality of content delivery servers 108 based on relative priority. In an embodiment, the content delivery server may host the content that may be delivered to the client device 106. Further, the application server 102 may be configured to identify a shortest path for the content delivery between the identified at least one content delivery server 108a and the client device 106 based on one or more pre-defined rules. In an embodiment, one or more network resources in the shortest path may be sliced and metered based on one or more pre-defined policies by the application server 102. Further, the application server 102 may be configured to transmit the content from the identified at least one content delivery server 108a to the client device 106 via the identified shortest path.

In an embodiment, the client device 106 may refer to a computing device used by a user. The client device 106 may comprise of one or more processors and one or more memories. The one or more memories may include computer readable code that may be executable by the one or more processors to perform predetermined operations. In an embodiment, the client device 106 may present a user-interface on a display screen via which the user of the client device may transmit a request to deliver content to the client device 106. In an embodiment, the client device 106 may include hardware and/or software to display/playback the content received from the application server 102. Examples of the client device 106 may include, but are not limited to, a personal computer, a laptop, a personal digital assistant (PDA), a mobile device, a tablet, or any other computing device.

A person with ordinary skills in the art will understand that the scope of the disclosure is not limited to the client device 106 as a separate entity. In an embodiment, the functionalities of the client device 106 can be integrated into the application server 102, and vice versa.

In an embodiment, the plurality of content delivery servers 108 may refer to a computing device that may be configured to store multimedia content that may be requested by the client device 106. In an embodiment, the plurality of content delivery servers 108 may include a special purpose operating system specifically configured to perform one or more database operations on the multimedia content. Examples of database operations may include, but are not limited to, Select, Insert, Update, and Delete. In an embodiment, the plurality of content delivery servers 108 may be further configured to index the multimedia content. In an embodiment, the plurality of content delivery servers 108 may include hardware and/or software that may be configured to perform one or more predetermined operations. In an embodiment, the plurality of content delivery servers 108 may be realized through various technologies such as, but not limited to, Microsoft® SQL Server, Oracle®, IBM DB2®, Microsoft Access®, PostgreSQL®, MySQL® and SQLite®, and the like.

In an embodiment, the communication network 104 may correspond to a communication medium through which the application server 102, the client device 106, and the plurality of content delivery servers 108 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 104 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN). The operation of the application server 102 has been discussed later in conjunction with FIG. 2.

FIG. 2 illustrates a block diagram of an application server 102 configured to achieve improved quality of service (QoS) for content delivery in a communication network 104, according to some embodiments of the present disclosure. As shown in the FIG. 2, the application server 102 may comprise a processor 202, a memory 204, a transceiver 206, a software defined networking (SDN) controller 208, a monitoring unit 210, a metering unit 212, and an input/output (IO) device 214. The SDN controller may further comprise of a content delivery server (CDS) identification unit 208a, CDS cache tracker 208b, and a shortest path identification unit 208c.

The processor 202 may comprise suitable logic, circuitry, interfaces, and/or code that may be configured to execute a set of instructions stored in the memory 204. The processor 202 may be implemented based on a number of processor technologies known in the art. The processor 202 may work in coordination with the transceiver 206, the SDN controller 208, the monitoring unit 210, the metering unit 212, and the I/O device 214 for achieving improved quality of service (QoS) for content delivery in the communication network. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 may comprise suitable logic, circuitry, interfaces, and/or code that may be configured to store the set of instructions, which are executed by the processor 202. In an embodiment, the memory 204 may be configured to store one or more programs, routines, or scripts that may be executed in coordination with the processor 202. In an embodiment, the memory 204 may be configured to store a configuration file 204a, one or more pre-defined rules 204b, and one or more pre-defined policies 204c. The memory 204 may be implemented based on a Random Access Memory (RAM), a Read-Only Memory (ROM), a Hard Disk Drive (HDD), a storage server, and/or a Secure Digital (SD) card.

The transceiver 206 may comprise of suitable logic, circuitry, interfaces, and/or code that may be configured to receive the content from the at least one content deliver server, via the communication network 104. The transceiver 206 may implement one or more known technologies to support wired or wireless communication with the communication network 104. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The SDN controller 208 may comprise suitable logic, circuitry, interfaces, and/or code that may be configured to achieve improved quality of service (QOS) for content delivery to the client device 106 via the communication network 104. In an embodiment, the SDN controller 208 may comprise the content delivery server (CDS) identification unit 208a, the CDS cache tracker 208b, and the shortest path identification unit 208c.

In an embodiment, the content delivery server (CDS) identification unit 208a may comprise suitable logic, circuitry, interfaces, and/or code that may be configured to determine the relative priority of each of the plurality of content delivery servers 108 in the communication network 104 based on at least one of one or more parameters and the configuration file 204a. The CDS identification unit 208a may be further configured to assign a weight to each of the one or more parameters. In an embodiment, the weight may be indicative of the importance of each of the one or more parameters. Further, the CDS identification unit 208a may be further configured to assign a rank to each of the plurality of content delivery servers based on the computed relative priority. In an embodiment, the content delivery server (CDS) identification unit 208a may be implemented as an Application-Specific Integrated Circuit (ASIC) microchip designed for a special application, such as to identify at least one content delivery server from the plurality of content delivery servers based on the relative priority. Further, the CDS identification unit 208a may be further configured to update the relative priority associated with the plurality of content delivery servers 108 based on the monitoring of the one or more parameters after a pre-defined time interval performed by the monitoring unit 210. In an embodiment, the CDS identification unit 208a may be further configured to maintain a list of one or more alternate content delivery servers other than the identified at least one content delivery server.

In an embodiment, the CDS cache tracker 208b may comprise suitable logic, circuitry, interfaces, and/or code that may be configured to track usage of the cache of each of the plurality of CDS. In an embodiment, the CDS cache tracker 208b may be implemented as an Application-Specific Integrated Circuit (ASIC) microchip designed for a special application, such as proactively pre-load and pre-fetch content into a cache of the application server based on at least one of streaming profiles, bit rate profiles, client proximity, and network topology. In an embodiment, the shortest path identification unit 208c may comprise suitable logic, circuitry, interfaces, and/or code that may be configured to identify a shortest path for the content delivery between the identified at least one content delivery server and the client device 106 based on one or more pre-defined rules 204b. The monitoring unit 210 may comprise suitable logic, circuitry, interfaces, and/or code that may be configured to monitor the one or more parameters associated with the communication network after a pre-defined time interval. The metering unit 212 may comprise suitable logic, circuitry, interfaces, and/or code that may be configured to measure usage of the content consumed by the client device 106. Further, metering unit 212 may be configured to slice one or more network resources in the shortest path based on one or more pre-defined policies.

The input/output (I/O) device 214 may comprise suitable logic, circuitry, interfaces, and/or code that may be configured to receive an input or transmit an output to the client device 106. The input/output unit 214 comprises of various input and output devices that may be configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

In operation, a user may utilize the client device 106 to transmit a request to deliver content to the client device 106. In an embodiment, the content may comprise at least one of a video content, an audio content, and a multimedia content. The transceiver 206 of the application server 102 may be configured to receive the request from the client device 106 via the communication network 104.

A person skilled in the art will understand that the scope of the disclosure should not be limited to only one client device 106 as described herein. A single client device 106 has been explained herein for the purpose of simplicity. In an embodiment, more than one client devices may be utilized to transmit a request to the application server 102. Further, the examples provided in supra are for illustrative purposes and should not be construed to limit the scope of the disclosure.

In response to the received request, the CDS identification unit 208a may be configured to determine the relative priority of each of the plurality of content delivery servers 108 in the communication network 104 based on at least one of one or more parameters and the configuration file 204a. In an embodiment, the one or more parameters may comprise at least one of client device proximity, network topology, path traffic conditions, link bandwidth, content delivery server's concurrent content serving limits, subscriber profile, type of stream requested, availability of content at the content delivery server, number of concurrent streams at a time instant of the request, a number of requests pending in queue at the content delivery server, and bit rate profiles available at the content delivery server. In an embodiment, the configuration file 204a may comprise information pertaining to content hosted at each of the plurality of content delivery servers 108 in the communication network 104.

In an exemplary scenario, a user request is received for a video content and four CDS may be present in the network. Let the CDS be denoted by CDS1, CDS2, CDS3, and CDS4. The configuration file 204a stored in the memory 204 may indicate that the requested content may be present only in CDS1, CDS2, and CDS4. Further the table 1 below illustrates the one or more parameters considered while determining the relative priority of each of the content delivery servers.

TABLE 1

| Parameters | CDS1 | CDS2 | CDS3 | CDS4 |
|---|---|---|---|---|
| Client device proximity | Near | Near | Far | Far |
| Path traffic conditions | Congested | Normal | Congested | Medium |
| Concurrent content serving limits | 5 | 5 | 8 | 5 |
| Number of requests pending in queue at the content delivery server | 2 | 1 | 0 | 5 |
| Number of concurrent streams at a time instant of the request | 5 | 2 | 8 | 4 |
| Availability of content at the content delivery server | Available | Available | Not Available | Available |

A person skilled in the art will understand that the scope of the disclosure should not be limited to determining the relative priority based on the aforementioned factors and using the aforementioned techniques. Further, the examples provided in supra are for illustrative purposes and should not be construed to limit the scope of the disclosure.

Thus, based on the one or more parameters and the information in the configuration file 204a, the CDS identification unit 208a may assign the relative priority to each of the CDS. Thus, in the exemplary scenario as discussed above, the CDS identification unit 208a may assign top relative priority to CDS2 followed by CDS1 followed by CDS4 and lastly CDS3.

After determining the relative priority of the plurality of content delivery servers 108, the CDS identification unit 208a may be configured to assign a weight to each of the one or more parameters. In an embodiment, the weight may be indicative of the importance of each of the one or more parameters. In an embodiment, the weight may be assigned within a range of 1-10 where 1 indicates high importance and 10 indicates low importance. For example, the table 2 shown below illustrates the weights assigned by the CDS identification unit 208a to each of the one or more parameters.

TABLE 2

| Parameters | Weight |
|---|---|
| Client device proximity | 7 |
| Path traffic conditions | 5 |
| Concurrent content serving limits | 4 |
| Number of requests pending in queue at the content delivery server | 3 |
| Number of concurrent streams at a time instant of the request | 3 |
| Availability of content at the content delivery server | 1 |

A person skilled in the art will understand that the scope of the disclosure should not be limited to assigning the weight based on the aforementioned factors and using the aforementioned techniques. Further, the examples provided in supra are for illustrative purposes and should not be construed to limit the scope of the disclosure.

After assigning the weights to each of the one or more parameters, the CDS identification unit 208a may be configured to assign a rank to each of the plurality of content delivery servers based on the computed relative priority and the assigned weights to each of the one or more parameters. Table 3 shown below shows an illustrative example of the rank assigned to each of the plurality of content delivery servers (CDS1, CDS2, CDS3, CDS4).

TABLE 3

| Content Delivery Server Name | Rank |
|---|---|
| CDS1 | 2 |
| CDS2 | 1 |
| CDS3 | 4 |
| CDS4 | 3 |

A person skilled in the art will understand that the scope of the disclosure should not be limited to assigning the rank to the plurality of CDS based on the aforementioned factors and using the aforementioned techniques. Further, the examples provided in supra are for illustrative purposes and should not be construed to limit the scope of the disclosure.

Thus, as shown in table 3, the CDS2 may be assigned rank 1, CDS1 may be assigned rank 2, CDS4 may be assigned rank 3, and CDS3 may be assigned rank 4. Based on the ranking of the plurality of content distribution servers and the determined relative priority, the CDS identification unit 208a may be configured to identify at least one content delivery server from the plurality of content delivery servers. In an embodiment, at least one identified content delivery server may host the content that may be delivered to the client device 106. For example, the CDS identification unit 208a may identify CDS2 as the content delivery server which hosts the content that may be delivered to the client device 106.

After identifying the at least one content delivery server from the plurality of content delivery servers, the shortest path identification unit 208c may be configured to identify a shortest path for the content delivery between the identified at least one content delivery server (CDS2) and the client device 106 based on one or more pre-defined rules 204b stored in the memory 204. In an embodiment, the one or more pre-defined rules may comprise one to one, one to many, many to many, many to one relationship between the one or more parameters including but not limited to network proximity, link bandwidth, link traffic conditions, user profiles, streaming profiles, Just In Time packaging workflow invocation, Just in Time Transcoding workflow invocation, and content delivery server cache usage. In an embodiment, the one or more pre-defined rules 204b may be configured based on MSO requirements. In an embodiment, one or more network resources in the shortest path may be sliced and metered based on one or more pre-defined policies 204c configured by the metering unit 212. In an embodiment, the one or more pre-defined policies 204c configured by the metering unit 212 may comprise content delivery server identification criteria. In an embodiment, such content delivery server identification criteria may include but not limited to content delivery server cache expiration policy, concurrent stream limits of a CDS, time since last CDS reboot and co-relation with mean time between failure (MTBF) of the CDS, link stability and link cost between the MTS and the client device 106. In an embodiment, application data about the shortest path established at each user/session level may be stored in the memory 204 of the application server 102.

After determining the shortest path, the CDS identification unit 208a may be configured to maintain a list of one or more alternate content delivery servers other than the identified at least one content delivery server. In an embodiment, the CDS identification unit 208a may be configured to select at least one alternate content delivery server from the list of the one or more alternate content delivery servers when the identified content delivery server experiences at least one of a sudden network surge or a network outage. After identification of the at least one content delivery server, the shortest path and the at least one alternate content delivery server, the transceiver 206 may be configured to transmit the content from the identified at least one content delivery server (CDS2) to the client device 106 via the identified shortest path. In an alternate embodiment, the transceiver 206 may be configured to transmit the content from the identified at least one alternate content delivery server.

The client device 106 may be configured to receive the requested content from the transceiver 206 either from the identified at least one content delivery server or the identified at least one alternate content delivery server via the identified shortest path. In an embodiment, the client device 106 may receive the requested content without any degradation of quality in the content because of the identified at least one content delivery server or the identified at least one alternate content delivery server and the identified shorted path thereby providing an improved QoS experience to the user of the client device 106. Further, even if the identified at least one content delivery server fails then the content may be delivered to the client device 106 from the identified at least one alternate content delivery server thereby providing an improved QoS experience to the user of the client device 106. Additionally, the user need not be forced to rate limit or switch over to a lower bit rate/low quality stream of the requested content as the shortest path is identified to deliver the content which reduces the latency.

In an embodiment, the monitoring unit 210 may be configured to monitor the one or more parameters associated with the communication network 104 after a pre-defined time interval. Based on the monitoring, the CDS identification unit 208a may be configured to update the relative priority associated with each of the plurality of content delivery servers after the pre-defined time interval. In an embodiment, the CDN cache tracker 208b may track the usage of CDN caches and maintain a list of content that is being requested across client requests along with integration with CDNs to maintain content expiration duration. Based on increasing client requests for viewing/loading content requests, the CDN cache tracker 208b may monitor the usage of CDN caches and measure expiration cache limits across content requests. Based on the monitoring performed by the CDS cache tracker 208b, the CDS cache tracker 208b may be configured to proactively pre-load content into cache of the application server 102 based on at least one of streaming profiles, bit rate profile, client proximity and network topology. Thus the streaming latency may be reduced thereby providing an improved QoS experience to the user of the client device 106.

FIG. 3 is a flow diagram that illustrates a method 300 for achieving improved quality of service (QoS) for content delivery in a communication network, in accordance with some embodiments of the present disclosure.

The method 300 may be described in the general context of computer executable instructions. Generally, computer executable instructions can include routines, programs, objects, components, data structures, procedures, modules, and functions, which perform particular functions or implement particular abstract data types. The method 300 may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternative methods. Additionally, individual blocks may be deleted from the method 300 without departing from the spirit and scope of the subject matter described herein. Furthermore, the method 300 can be implemented in any suitable hardware, software, firmware, or combination thereof.

With reference to the FIG. 3, at block 302, the application server 102 may be configured to receive a request from the client device 106 to deliver content to the client device 106. At block 304, the application server 102 may be configured to determine the relative priority of each of the plurality of content delivery servers 108 in the communication network 104 based on at least one of one or more parameters and a configuration file. At block 306, the application server 102 may be configured to assign a rank to each of the plurality of content delivery servers 108 based on the computed relative priority. At block 308, the application server 102 may be configured to identify at least one content delivery server 108a from the plurality of content delivery servers 108 based on relative priority and the assigned rank. At block 310, the application server 102 may be configured to identify the shortest path for the content delivery between the identified at least one content delivery server 108a and the client device 106 based on one or more pre-defined rules 204b. At block 312, the application server 102 may be configured to maintain the list of one or more alternate content delivery servers other than the identified at least one content delivery server. At block 314, the application server 102 may be configured to proactively pre-load and pre-fetch content into the cache of the application server 102 based on at least one of streaming profiles, bit rate profiles, client proximity, and network topology. At block 316, the application server 102 may be configured to transmit the content (proactively pre-loaded and pre-fetched content into the cache) from the identified at least one content delivery server or the one or more alternate content delivery servers to the client device 106 via the identified shortest path.

Computer System

FIG. 4 is a block diagram of an exemplary computer system for implementing embodiments consistent with the present disclosure. Variations of computer system 401 may be used for achieving improved quality of service (QoS) for content delivery in a communication network by using the application server 102. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft.NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described apparatuses and method for achieving improved quality of service (QoS) for content delivery in a communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for achieving improved quality of service (QOS) for content delivery in a communication network, the method comprising:

receiving, by an application server, a request from a client device to deliver content to the client device;

determining, by the application server, a relative priority of each of a plurality of content delivery servers in the communication network based on at least one of one or more parameters and a configuration file comprising information pertaining to content hosted at each of the plurality of content delivery servers;

identifying, by the application server, at least one content delivery server from the plurality of content delivery servers based on relative priority, wherein the at least one content delivery server hosts the content that is to be delivered to the client device;

identifying, by the application server, a shortest path for the content delivery between the identified at least one content delivery server and the client device based on one or more pre-defined rules defining relationships between one or more parameters, wherein the parameters comprise at least network topology and concurrent content serving limits of the at least one content delivery server, and wherein one or more network resources in the shortest path are sliced and metered based on one or more pre-defined policies; and transmitting, by the application server, the content from the identified at least one content delivery server to the client device via the identified shortest path.

2. The method of claim 1, wherein the one or more parameters comprises at least one of client device proximity, path traffic conditions, link bandwidth, a content delivery server's concurrent content serving limits wherein the content delivery server is from among the plurality of content delivery servers, subscriber profile, type of stream requested, availability of content at the content delivery server, number of concurrent streams at a time instant of the request, a number of requests pending in queue at the content delivery server, bit rate profiles available at the content delivery server, Just In Time packaging workflow invocation, Just in Time Transcoding workflow invocation, content delivery server cache usage.

3. The method of claim 1, further comprising assigning a weight to each of the one or more parameters, wherein the weight is indicative of the importance of each of the one or more parameters.

4. The method of claim 1, further comprising assigning a rank to each of the plurality of content delivery servers based on the computed relative priority.

5. The method of claim 1, wherein the one or more pre-defined rules comprises one to one, one to many, many to many, many to one relationship between the one or more parameters.

6. The method of claim 1, further comprising maintaining a list of one or more alternate content delivery servers other than the identified at least one content delivery server, wherein at least one alternate content delivery server is selected from the list of the one or more alternate content delivery servers when the identified content delivery server experiences at least one of a sudden network surge or a network outage.

7. The method of claim 1, further comprising proactively pre-load and pre-fetch content into a cache of the application server based on at least one of streaming profiles, bit rate profiles, client proximity, and network topology.

8. The method of claim 1, further comprising monitoring the one or more parameters associated with the communication network after a pre-defined time interval.

9. The method of claim 8, further comprising updating the relative priority associated with each of the plurality of content delivery servers based on the monitoring after the pre-defined time interval.

10. The method of claim 1, wherein the one or more pre-defined policies comprises content delivery server identification criteria.

11. The method of claim 1, wherein the configuration file comprises information pertaining to content hosted at each of the plurality of content delivery servers in the communication network.

12. The method of claim 1, wherein the content comprises at least one of a video content, an audio content, and a multimedia content.

13. An application server to achieve improved quality of service (QoS) for content delivery in a communication network, the application server comprising:

a processor; and a memory communicatively coupled to the processor, wherein the memory stores processor instructions, which on execution, causes the processor to:

receive a request from a client device to deliver content to the client device;

determine a relative priority of each of a plurality of content delivery servers in the communication network based on at least one of one or more parameters and a configuration file comprising information pertaining to content hosted at each of the plurality of content delivery servers:

identify at least one content delivery server from the plurality of content delivery servers based on relative priority, wherein the at least one content delivery server hosts the content that is to be delivered to the client device;

identify a shortest path for the content delivery between the identified at least one content delivery server and the client device based on one or more pre-defined rules defining relationships between one or more parameters wherein the parameters comprise at least network topology and concurrent content serving limits of the at least one content delivery server and, wherein one or more network resources in the shortest path are sliced and metered based on one or more pre-defined policies; and transmit the content from the identified at least one content delivery server to the client device via the identified shortest path.

14. The application server of claim 13, wherein the one or more parameters comprises at least one of client device proximity, path traffic conditions, link bandwidth, a content delivery server's concurrent content serving limits wherein the content delivery server is from among the plurality of content delivery servers, subscriber profile, type of stream requested, availability of content at the content delivery server, number of concurrent streams at a time instant of the request, a number of requests pending in queue at the content delivery server, bit rate profiles available at the content delivery server, Just In Time packaging workflow invocation, Just in Time Transcoding workflow invocation, content delivery server cache usage.

15. The application server of claim 13, wherein the processor is configured to assign a weight to each of the one or more parameters, wherein the weight is indicative of the importance of each of the one or more parameters.

16. The application server of claim 13, wherein the processor is configured to assign a rank to each of the plurality of content delivery servers based on the computed relative priority.

17. The application server of claim 13, wherein the one or more pre-defined rules comprises one to one, one to many, many to many, many to one relationship between the one or more parameters.

18. The application server of claim 13, wherein the processor is configured to maintain a list of one or more alternate content delivery servers other than the identified at least one content delivery server, wherein at least one alternate content delivery server is selected from the list of the one or more alternate content delivery servers when the identified content delivery server experiences at least one of a sudden network surge or a network outage.

19. The application server of claim 13, wherein the processor is configured to proactively pre-load and pre-fetch content into a cache of the application server based on at least one of streaming profiles, bit rate profiles, client proximity, and network topology.

20. The application server of claim 13, wherein the processor is configured to monitor the one or more parameters associated with the communication network after a pre-defined time interval.

21. The application server of claim 20, wherein the processor is configured to update the relative priority associated with each of the plurality of content delivery servers based on the monitoring after the pre-defined time interval.

22. A non-transitory computer-readable storage medium having stored thereon, a set of computer-executable instructions for causing a computer comprising one or more processors to perform steps comprising:

receiving a request from a client device to deliver content to the client device;

determining, a relative priority of each of a plurality of content delivery servers in a communication network based on at least one of one or more parameters and a configuration file comprising information pertaining to content hosted at each of the plurality of content delivery servers;

identifying at least one content delivery server from the plurality of content delivery servers based on relative priority, wherein the at least one content delivery server hosts the content that is to be delivered to the client device;

identifying a shortest path for the content delivery between the at least one content delivery server and the client device based on one or more pre-defined rules defining relationships between one or more parameters wherein the parameters comprise at least network topology and concurrent content serving limits of the at least one content delivery server and, wherein one or more network resources in the shortest path are sliced and metered based on one or more pre-defined policies; and transmitting the content from the identified at least one content delivery server to the client device via the identified shortest path.

* * * * *